US009495437B1

(12) United States Patent
Jonsson et al.

(10) Patent No.: US 9,495,437 B1
(45) Date of Patent: *Nov. 15, 2016

(54) SYSTEM AND METHOD FOR ACCESSING DIMENSIONAL DATABASES

(71) Applicant: Dell Software Inc., Aliso Viejo, CA (US)

(72) Inventors: Jan Henrik Jonsson, Long Beach, CA (US); Debbie M. Peabody, Orange, CA (US); Aleksey Mikhailovich Bazhenov, Mission Viejo, CA (US)

(73) Assignee: Dell Software Inc., Alison Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/869,072

(22) Filed: Sep. 29, 2015

Related U.S. Application Data

(63) Continuation of application No. 14/073,822, filed on Nov. 6, 2013, now Pat. No. 9,183,272.

(51) Int. Cl.
*G06F 17/00* (2006.01)
*G06F 17/30* (2006.01)

(52) U.S. Cl.
CPC ... *G06F 17/30592* (2013.01); *G06F 17/30418* (2013.01); *G06F 17/30477* (2013.01); *G06F 17/30563* (2013.01); *G06F 17/30864* (2013.01); *G06F 17/30982* (2013.01)

(58) Field of Classification Search
CPC ............ G06F 17/30592; G06F 17/30; G06F 17/30297; G06F 17/30386; G06F 17/30389
See application file for complete search history.

(56) References Cited

U.S. PATENT DOCUMENTS

| | | |
|---|---|---|
| 5,379,419 A | 1/1995 | Heffernan et al. |
| 5,864,842 A | 1/1999 | Pederson et al. |
| 6,766,334 B1 | 7/2004 | Kaler et al. |
| 7,203,686 B1 | 4/2007 | Sinclair et al. |
| 7,275,024 B2 | 9/2007 | Yeh et al. |
| 7,421,427 B2 | 9/2008 | DeForeest et al. |
| 7,647,298 B2 | 1/2010 | Adya et al. |
| 7,657,516 B2 | 2/2010 | Zaman et al. |
| 7,747,608 B1 | 6/2010 | Gheorghe et al. |

(Continued)

OTHER PUBLICATIONS

U.S. Appl. No. 14/073,822, Jonsson.

(Continued)

*Primary Examiner* — Truong Vo
(74) *Attorney, Agent, or Firm* — Winstead PC

(57) ABSTRACT

In one embodiment, a method includes defining a slice of a dimensional database. The slice includes at least one dimension and at least one measurement and is expressable as a table. The method further includes building, in a structured query language (SQL) dialect, a single query that queries the slice and one or more non-dimensional databases. The SQL dialect represents the at least one dimension, the at least one measurement, and data attributes of the one or more non-dimensional databases. In addition, the method includes parsing the single query. The parsing includes generating a dimensional query for the dimensional database and a non-dimensional query for each of the one or more non-dimensional databases. Furthermore, the method includes executing the dimensional query on the dimensional database. Moreover, the method includes, for each non-dimensional database of the one or more non-dimensional databases, executing the non-dimensional query on the non-dimensional database.

20 Claims, 5 Drawing Sheets

(56) References Cited

U.S. PATENT DOCUMENTS

| | | |
|---|---|---|
| 2006/0271568 A1 | 11/2006 | Balkir et al. |
| 2009/0249125 A1 | 10/2009 | Bhatawdekar et al. |
| 2009/0254916 A1 | 10/2009 | Bose et al. |
| 2010/0017395 A1 | 1/2010 | Wayn et al. |
| 2010/0049649 A1 | 2/2010 | Shepherd |
| 2010/0049694 A1 | 2/2010 | Deffler |
| 2010/0121868 A1 | 5/2010 | Biannic et al. |
| 2010/0153430 A1 | 6/2010 | Mordvinov et al. |

OTHER PUBLICATIONS

U.S. Appl. No. 13/098,298, Harrison.
U.S. Appl. No. 14/633,826, Alagappan.
NoSQL, A Relational Database Management System, http://www.strozzi.it/cgi-bin/CSA/tw7/1/enUS/nosq1/Home%20Page 3 pages.
Perry, Geva, "How Cloud & Utility Computing are Different", http://gigaom.com/2008/02/28/how-cloud-utility-computing-are-different/ 21 pages.
Understanding MySQL Internals Chapter 7 p. 119, 2007.
Browne, Julian, "Brewer's CAP Theorem", http://www.julianbrowne.com/article/viewer/brewers-cap-theorem 8 pages, Jan. 11, 2009.
Bouman, Ronald, My SQL 5.1 Plugins, http://rpbouman.blogspot.com/ pp. 1-15.
Amazon Elastic Compute Cloud Elasticfox, Getting Started Guide, Elasticfox Version 1.7-000108.
Quest Software, Toad for Data Analysts, 2009, 2 pages.
Harrison, Guy, Quest Software, "DBMS.next is the next DBMS revolution looming?", 6 pages.
Lai, Eric, "NO to SQL? Anti-database movement gains steam, but can enterprises take open-source alternatives Hadoop, Voldemort seriously?", Jul. 1, 2009, http://www.computerworld.com/s/article/print/9135086/no to SQL__Ant . . . 2 pages.
Shiers, Alan; "SQLeo Beginner Users Guide"; sqleo.sourceforge.net/guide/#_Toc327875425; Jun. 20, 2012; 37 pages.
Activedbsoft.; "Customizable SQL Query Building Environment: Simple and Clear Presentation of Database Structure and User Queries"; http://activequerybuilder.com/product_environment.html; Aug. 23, 2014; 3 pages.
Activedbsoft.; "Metadata Handling and Filtration: Various Ways to Load and Represent Metadata in Active Builder"; http://www.activequerybuilder.com/product_metadata.html; Jul. 14, 2014; 3 pages.
Activedbsoft.; "Programming API: Programmatic SQL Query Analysis and Modification"; http://activequerybuilder.com/product_api.html; Aug. 24, 2014; 3 pages.
Activedbsoft.; "Visual User Interface: Building Complex SQL Queries Visually Was Never Been So Easy"; http://activequerybuilder.com/product_ui.html; Aug. 23, 2014; 4 pages.
Activedbsoft.; "Active Query Builder: Visual SQL Query Builder Component" ; http://activequerybuilder.com/product.html; Aug. 23, 2014; 4 pages.
Lount, Tina; "Alpine Overview"; https://alpine.atlassian.net/wiki/display/DOC/Alpine+Overview; Oct. 2, 2014; 2 pages.
Williams, Alex; "Alteryx Opens Big Data-Analytics Apps Studio for the Rest of Us"; http://techcrunch.com/2012/10/07/alteryx-opens-big-data-analytics-apps-studio-for-the-rest-of-us/; Oct. 7, 2012; 7 pages.
Devart; "Hands-Free Building of Queries with Query Builder"; http://www.devart.com/dbforge/mysql/studio/demostutorials/querybuilder.html; Aug. 12, 2014; 5 pages.
Activedbsoft.; "FlySpeed SQL Query"; http://www.activedbsoft.com/overview-querytool.html; Aug. 20, 2013; 3 pages.
"Graphical Query Builder"; http://pgadmin.org/docs/dev/gqb.html; May 26, 2013; 2 pages.
"Graphical Query Designer User Interface"; http://msdn.microsoft.com/en-us/library/ms365414.aspx; Jul. 17, 2013; 6 pages.
Grimes, Seth; "Lyzasoft's Non-Analytical Approach to Analytics"; http://www.informationweek.com/software/information-management/lyzasofts-non-analytical-approach-to-analytics/d/d-id/1072214?; Sep. 22, 2008; 6 pages.
Wikimedia Foundation, Inc.; "OpenRefine"; http://en.wikipedia.org/wiki/OpenRefine; last modified Nov. 11, 2014; 5 pages.
Standen, James; "Putting Data Analysis into the Hands of the Business User"; http://datamartist.com/data-analysis-for-the-business-user; Jul. 24, 2014; 3 pages.
"Query Tool"; http://pgadmin.org/docs/dev/query.html; Jul. 8, 2014; 5 pages.
Embarcadero Technologies, Inc.; "Embarcadero Rapid SQL User Guide" version 8.7.2/XE6; Dec. 2014; 1085 pages.
Kaldirimoglu, Devrim; "Springbok: Self-Service Data for Business Users"; Jun. 15, 2014; 2 pages.
Kandel, Sean; "Value of Data Transformation"; 2014; 5 pages.
Oracle; "Using Query Builder in Oracle SQL Develper 3.0" http://www.oracle.com/webfolder/technetwork/tutorials/obe/db/sqldev/r30/SQLdev3.0_Q . . . ; Dec. 15, 2013; 19 pages.
Datameer, Inc.; "What is Big Data Analytics?"; http://www.datameer.com/product/data-analytics.html; Jul. 4, 2014; 3 pages.
Harris, Derrick; "Why Trifacta is Teaching Humans and Data to Work Together"; Oct. 4, 2012; 9 pages.
Wikimedia Foundation, Inc.; "WYSIWYG"; http://en.wikipedia.org/wiki/wysiwyg; last modified on Dec. 1, 2014; 6 pages.

SYSTEM AND METHOD FOR ACCESSING DIMENSIONAL DATABASES

CROSS-REFERENCE TO RELATED APPLICATIONS

This patent application is a continuation of U.S. patent application Ser. No. 14/073,822, filed Nov. 6, 2013, which application is hereby incorporated by reference.

BACKGROUND

Technical Field

The present invention relates generally to databases and more particularly, but not by way of limitation, to systems and methods for accessing dimensional databases.

History of Related Art

Utilization of dimensional databases has become increasingly common. One type of dimensional database is a cube database, such as an OLAP (Online Analytical Processing) cube. The cube database can include measurements and dimensions. A measurement in a cube database can be a data point or aggregation, such as a numeric fact. These measurements can be categorized by the dimensions. Examples of dimensions include time, geographic location, customers, and products.

One of the purposes of an OLAP cube is to provide aggregated data views to allow users/analysts to drill down into these aggregations to discover trends and anomalies. The native query language for cube databases is usually a language other than SQL such as MultiDimensional eXpressions (MDX). The syntax of MDX, for example, is different from the syntax of SQL. In addition, in order to accommodate functional nuances of dimensional databases such as those described above, MDX includes many features that are not natively included in SQL. As a consequence, many users find it difficult to query and realize the benefits of dimensional databases.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on a computer system comprising at least one server computer, defining, responsive to user input, a slice of a dimensional database. The slice includes at least one dimension and at least one measurement of the dimensional database. The slice is expressable as a table. The method further includes the computer system building, in a structured query language (SQL) dialect, a single query that queries the slice and one or more non-dimensional databases. The SQL dialect represents, using SQL constructs, the at least one dimension, the at least one measurement, and data attributes of the one or more non-dimensional databases. In addition, the method includes the computer system parsing the single query. The parsing includes generating a dimensional query for the dimensional database and a non-dimensional query for each of the one or more non-dimensional databases. Furthermore, the method includes the computer system executing the dimensional query on the dimensional database. Moreover, the method includes, for each non-dimensional database of the one or more non-dimensional databases, the computer system executing the non-dimensional query on the non-dimensional database.

In one embodiment, an information handling system includes at least one processing unit. The at least one processing unit is operable to implement a method. The method includes defining, responsive to user input, a slice of a dimensional database. The slice includes at least one dimension and at least one measurement of the dimensional database. The slice is expressable as a table. The method further includes building, in a structured query language (SQL) dialect, a single query that queries the slice and one or more non-dimensional databases. The SQL dialect represents, using SQL constructs, the at least one dimension, the at least one measurement, and data attributes of the one or more non-dimensional databases. In addition, the method includes parsing the single query. The parsing includes generating a dimensional query for the dimensional database and a non-dimensional query for each of the one or more non-dimensional databases. Furthermore, the method includes executing the dimensional query on the dimensional database. Moreover, the method includes, for each non-dimensional database of the one or more non-dimensional databases, executing the non-dimensional query on the non-dimensional database.

In one embodiment, a computer-program product includes a non-transitory computer-usable medium having computer-readable program code embodied therein. The computer-readable program code is adapted to be executed to implement a method. The method includes defining, responsive to user input, a slice of a dimensional database. The slice includes at least one dimension and at least one measurement of the dimensional database. The slice is expressable as a table. The method further includes building, in a structured query language (SQL) dialect, a single query that queries the slice and one or more non-dimensional databases. The SQL dialect represents, using SQL constructs, the at least one dimension, the at least one measurement, and data attributes of the one or more non-dimensional databases. In addition, the method includes parsing the single query. The parsing includes generating a dimensional query for the dimensional database and a non-dimensional query for each of the one or more non-dimensional databases. Furthermore, the method includes executing the dimensional query on the dimensional database. Moreover, the method includes, for each non-dimensional database of the one or more non-dimensional databases, executing the non-dimensional query on the non-dimensional database.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
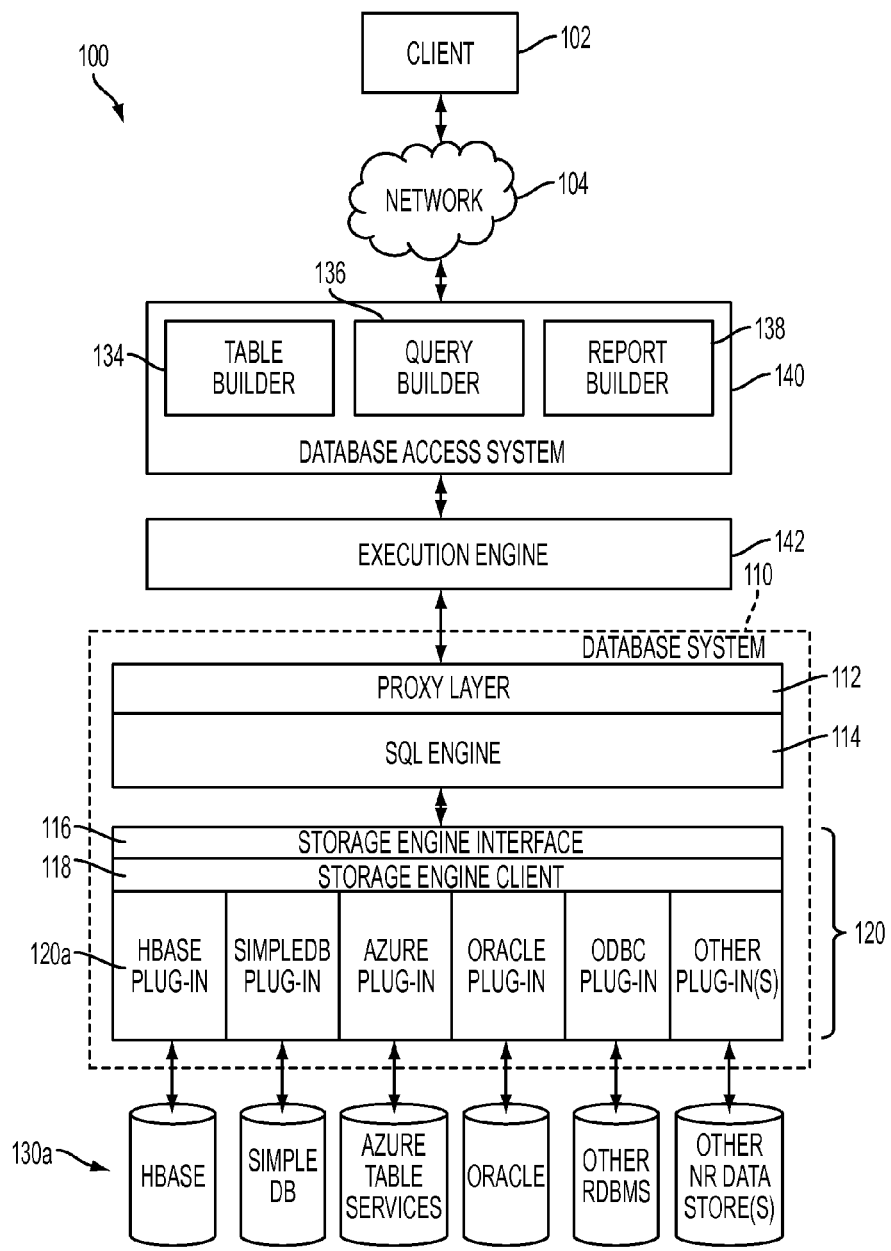
FIG. 1 depicts an embodiment of a computing environment.

A common trait among many dimensional data stores is lack of SQL-based access. Specialized programming can therefore be required to access the data in these databases and to combine that data with data from other databases. This can be problematic for those without a programming background. This disclosure describes systems and methods for accessing dimensional and non-dimensional data stores using a SQL dialect. In a typical embodiment, the SQL dialect permits both dimensional and non-dimensional data stores to be queried via a single query without sacrificing various characteristic behaviors and functionalities of dimensional databases. For purposes of this patent application, a SQL dialect refers to an extension of SQL to accommodate features not natively supported. More particularly, various embodiments described herein relate to a SQL dialect for querying dimensional and non-dimensional data stores.

An Example of a SQL Dialect

An example of a SQL dialect that can be used to query and combine data from dimensional and non-dimensional data stores will now be described. In one aspect, in certain embodiments, the SQL dialect permits dimensions and measurements of dimensional databases to be included in a SELECT statement. For example, Table 1 below is a two-dimensional representation of raw data that could be included in an exemplary dimensional database called "Sales." According to the example of Table 1, the columns labeled "Date," "Product," and "SalesPerson" correspond to dimensions while the columns labeled "Gross" and "Commission" correspond to measurements.

TABLE 1

| Date | Product | Gross | SalesPerson | Commission |
|---|---|---|---|---|
| Jan. 1, 2012 | A | 2981 | 1 | 48 |
| Jan. 1, 2012 | B | 1546 | 1 | 64 |
| Feb. 1, 2012 | A | 8466 | 1 | 59 |
| Feb. 1, 2012 | B | 1799 | 2 | 77 |
| Mar. 1, 2012 | A | 8431 | 2 | 76 |
| Mar. 1, 2012 | B | 909 | 2 | 22 |
| Apr. 1, 2012 | A | 1400 | 1 | 44 |
| Apr. 1, 2012 | B | 6419 | 1 | 91 |
| May 1, 2012 | A | 5777 | 1 | 29 |
| May 1, 2012 | B | 3190 | 2 | 33 |
| Jun. 1, 2012 | A | 8941 | 2 | 8 |
| Jun. 1, 2012 | B | 3189 | 2 | 22 |
| Jul. 1, 2012 | A | 3672 | 1 | 16 |
| Jul. 1, 2012 | B | 7994 | 1 | 76 |
| Aug. 1, 2012 | A | 3331 | 1 | 51 |
| Aug. 1, 2012 | B | 3932 | 2 | 55 |
| Sep. 1, 2012 | A | 7569 | 2 | 91 |
| Sep. 1, 2012 | B | 9692 | 2 | 88 |
| Oct. 1, 2012 | A | 1024 | 1 | 10 |
| Oct. 1, 2012 | B | 3634 | 1 | 6 |

TABLE 1-continued

| Date | Product | Gross | SalesPerson | Commission |
|---|---|---|---|---|
| Nov. 1, 2012 | A | 4564 | 1 | 98 |
| Nov. 1, 2012 | B | 5988 | 2 | 68 |
| Dec. 1, 2012 | A | 9143 | 2 | 11 |
| Dec. 1, 2012 | B | 1429 | 2 | 25 |

A two-dimensional view of dimensional data, such as is illustrated by Table 1, may be periodically referenced herein as a slice of the dimensional database. In a typical embodiment, the slice of the dimensional database can be represented via the SQL dialect using, for example, the query below, which would generally include all data from Table 1.

SELECT Date, Product, Gross, SalesPerson, Commission
 FROM Sales

By way of further example, with respect to Table 1, if it were desired to see measurements over only the product dimension, the query below could be fashioned using the SQL dialect, which would generally yield the data shown in Table 2.

SELECT Product, Gross, Commission FROM Sales

TABLE 2

| Product | Gross | Commission |
|---|---|---|
| A | 65299 | 541 |
| B | 49721 | 627 |

In addition, the SQL dialect can permit, for example, dimensions or measurements to be specified in a WHERE clause. For instance, the query below could be used to obtain the data shown in Table 3.

SELECT Date, Gross, Commission FROM Sales
 WHERE Product='A'

TABLE 3

| Date | Gross | Commission |
|---|---|---|
| Jan. 1, 2012 | 2981 | 48 |
| Feb. 1, 2012 | 8466 | 59 |
| Mar. 1, 2012 | 8431 | 76 |
| Apr. 1, 2012 | 1400 | 44 |
| May 1, 2012 | 5777 | 29 |
| Jun. 1, 2012 | 8941 | 8 |
| Jul. 1, 2012 | 3672 | 16 |
| Aug. 1, 2012 | 3331 | 51 |
| Sep. 1, 2012 | 7569 | 91 |
| Oct. 1, 2012 | 1024 | 10 |
| Nov. 1, 2012 | 4564 | 98 |
| Dec. 1, 2012 | 9143 | 11 |

In another aspect, the SQL dialect can permit one or more dimensional and one or more non-dimensional data stores (e.g., relational data stores) to be queried in a single query. In a typical embodiment, the SQL dialect enables utilization of a table-identifier prefix to specify each table that is queried. For example, in the query below, the table-identifier prefix 'a' is used to represent a particular slice of the dimensional database discussed above. The particular slice is defined by a query specified in the SQL dialect, which is then included in a subselect statement (i.e., a SELECT statement that is nested, e.g., within a FROM clause). The table-identifier prefix 'b' is used to represent a table called "Sales" from a relational database called "RelationalHR." Exemplary data for the table called "Sales" is shown in Table 4. According to this example, the query below would yield the data shown in Table 5.

```
SELECT b.Name, a.Commission+b.BaseSalary Total
  FROM (SELECT SalesPerson
    FROM DimensionalSales.Sales) a,
    RelationalHR.SalesPeople b
  WHERE a.SalesPerson=b.SalesPerson
```

TABLE 4

| SalesPerson | Name | BaseSalary |
| --- | --- | --- |
| 1 | Jeremy Jackson | 600 |
| 2 | Helen Font | 500 |

TABLE 5

| Name | Total |
| --- | --- |
| Jeremy Jackson | 5390 |
| Helen Font | 4576 |

Example of a System Utilizing a SQL Dialect

FIG. 1 depicts an embodiment of a computing environment 100 for providing access to dimensional and non-dimensional data stores utilizing a SQL dialect such as, for example, the SQL dialect described above. In the depicted embodiment, the computing environment 100 includes a client 102, a database access system 140, an execution engine 142, and a database system 110. The client 102, the database access system 140, the execution engine 142, and the database system 110 can be implemented on the same or different computing machines.

In one embodiment, the client 102 accesses the database access system 140 over a network 104 such as a LAN or a WAN (e.g., the Internet). The client 102 can be implemented in one or more physical computing machines. For example, the client 102 can be a desktop, laptop, tablet, wireless handheld device (such as a smartphone or PDA), or the like. The client 102 can include software for enabling a user to interact with the database access system 140. As shown, the client 102 communicates with the database access system 140.

The database access system 140 can generate one or more user interfaces that enable the user to access the database system 110 using the SQL dialect. For illustrative purposes, the database access system 140 is shown to include a table builder 134, a query builder 136, and a report builder 138. The table builder 134 generally includes functionality to enable definition of a slice of a dimensional data store. In certain embodiments, the definition can be defined responsive to input from the user. As described above, the slice can be characterized by a query established using the SQL dialect. In various embodiments, the slice can be graphically selected by the user, be directly specified by the user as a SQL-dialect query, etc.

In a typical embodiment, the query builder 136 serves as a tool to build, using the SQL dialect, a query that queries one or more slices of dimensional databases (e.g., slices defined as described with respect to the table builder 134) and any non-dimensional data stores (e.g., relational data stores). The report builder 138 typically allows the user to define and view reports in terms of queries built by the query builder 136. It should be appreciated that the functionality of the table builder 134, the query builder 136, and the report builder 138 can be combined into a single component, redistributed among the same, fewer, or additional components, and/or the like.

The execution engine 142 is operable to receive, from the database access system 140, a query in the SQL dialect. In a typical embodiment, the execution engine 142 translates the query from the SQL dialect to SQL and passes the translated query to the database system 110. In one embodiment, the database system 110 includes one or more servers, which may be geographically co-located or geographically dispersed (e.g., in different data centers). The database system 110 can also be implemented using one or more virtual machines. The database system 110 (and/or the database access system 140) can also be implemented in a shared resources environment, such as a cloud computing environment or the like. For example, the database system 110 can be implemented as a machine instance or virtual machine running on a cloud computing platform, such as the Amazon Elastic Computer Cloud (EC2) provided by Amazon Web Services™. Exemplary operation of the database system 110 is described in detail in U.S. patent application Ser. No. 13/098,298, which application is hereby incorporated by reference.

In certain embodiments, the database system 110 includes features for mapping non-relational data stores (130a) such as, for example, dimensional data stores, to a relational schema. Once a data store 130a has been mapped, the database system 110 can translate SQL statements received from the execution engine 142 into a format for accessing the data store 130a. As shown, the database system 110 includes a proxy layer 112, a SQL engine 114, and a storage engine 120 including several plug-ins 120a. In the depicted embodiment, the execution engine 142 can access the database system 110 through the proxy layer 112. In certain embodiments, the proxy layer 112 pre-processes SQL statements received from the execution engine 142. For example, the proxy layer 112 may split or divide a SQL statement that accesses multiple back-end data sources into separate queries tailored for each specific source. The proxy layer 112 can also analyze each query in order to determine query optimizations that may improve performance. The proxy layer 112 can also perform certain dynamic, on-the-fly processing functions.

In certain embodiments, the proxy layer 112 provides pre-processed SQL statements to a SQL engine 114. The SQL engine 114 can be a module that generates a query execution plan for each SQL statement. The query execution plan can include information on what algorithm to use to execute the SQL statement, which indices to access, and so forth. From this execution plan, the SQL engine 114 generates a set of execution plan instructions. The SQL engine 114 can provide these execution plan instructions to the storage engine 120 via a storage engine interface.

The storage engine 120 can be a module that communicates with one or more back-end data stores 130a, such as dimensional and non-dimensional data stores. A storage engine interface 116 of the storage engine 120 can include an API that allows the SQL engine 114 to communicate the execution plan instructions to the data stores 130a. The storage engine 120 also includes a storage engine client 118 that provides access to configuration data about the data stores 130a. Configuration data stored by the storage engine client 118 can include connectivity information regarding how to connect to a data store 130a. This connectivity information can include, for example, network connectivity information such as IP address, URL, port, and so forth, web service interface information (such as SOAP, XML, and/or WSDL interfaces), and the like. Further, the configuration data can reflect the data store(s) 130a that each plug-in 120a communicates with. When a plug-in 120a is initially added to the database system 110, the storage engine 120 can provide functionality for the plug-in 120a to register with the storage engine client 118 to establish this configuration data.

In one embodiment, the storage engine client 118 receives the execution plan instructions from the storage engine interface 116 and selects one or more plug-ins 120a to send the instructions to based on the configuration data. The plug-in 120a can then translate the instructions into one or more API calls, other remote procedure calls, web service calls, REST calls, or the like to one or more data stores 130a.

Several plug-ins 120a are shown in FIG. 1. Each plug-in 120a can be designed to communicate with one or more different data stores 130a. Some example non-relational data stores 130a are shown, including Apache™ Hadoop HBase, Amazon® SimpleDB™, and Azure Table Services™. Other examples of non-relational data stores that may be included in certain implementations can include, among others, HyperTable, MongoDB, CouchDB, MemcacheDB, Megastore/GAE, Cassandra, Voldemort, Tokyo Cabinet, Dynamo, Dynamite, BigTable, Scalaris, Persevere, and Redis. The non-relational data store 130a can also include business intelligence data sources, file systems, flat file databases, or other data repositories.

Certain plug-ins 120a can also communicate with relational databases. For example, a plug-in 120a is shown for communicating with Oracle. An ODBC plug-in 120a can also be provided for communicating with other relational databases via the Open Database Connectivity (ODBC) API. By providing functionality for communicating with relational databases as well as non-relational data stores, the plug-ins 120a can facilitate merging, joining, exporting, or combining data from both relational and non-relational data sources. As shown, additional (or fewer) plug-ins 120a to other data stores 130a can also be provided.

In one embodiment, the database system 110 includes some or all the features of the MySQL® RDBMS. The plug-ins 120a can therefore be table handlers and/or storage engines that interface with the MySQL® engine. However, the database system 110 is not limited to MySQL® implementations and can be used in conjunction with other database management systems, such as PostgreSQL™ (also known as Postgres), or as a stand-alone database system independent of any currently-available commercial or non-commercial database platforms.

The example database system 110 architecture shown can also be varied considerably in other implementations. For example, the database system 110 could map one or more non-relational and/or relational data stores to one or more relational tables without employing a plug-in or storage engine architecture. The proxy layer 112 may also likewise be optional in some embodiments.

Example of a Process for Querying Using a SQL Dialect

Figure 2:
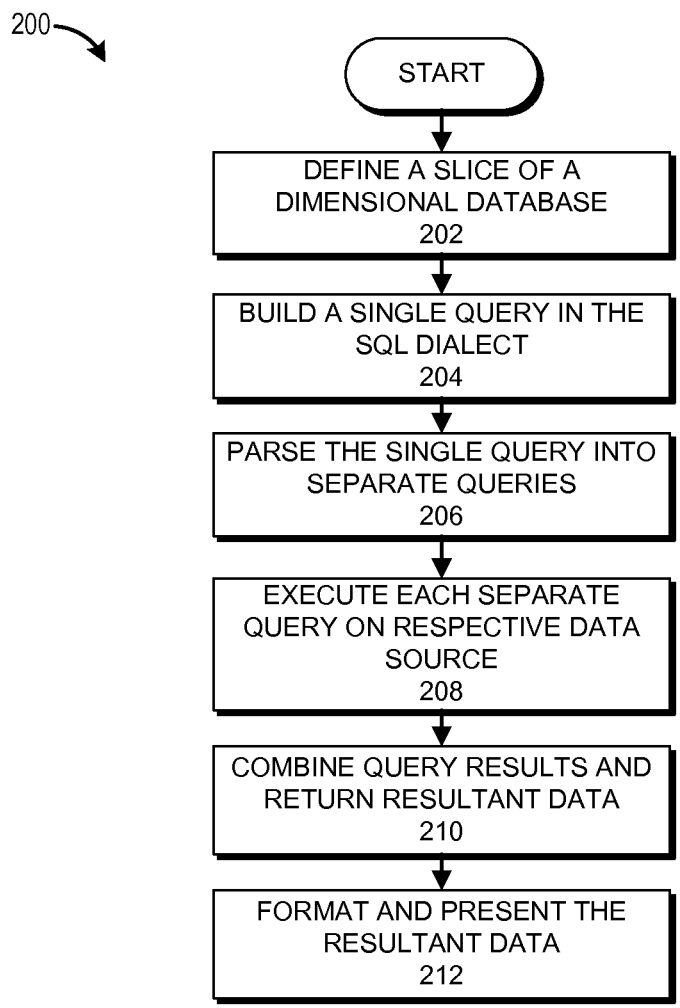
FIG. 2 illustrates a process for querying dimensional and non-dimensional data stores.

FIG. 2 presents a flowchart of an example of a process 200 for querying dimensional and non-dimensional data stores. The process 200 can be implemented by any system that can access one or more data sources. For example, the process 200, in whole or in part, can be implemented by one or more of the table builder 134, the query builder 136, the report builder 138, the database access system 140, the execution engine 142, and/or the database system 110 (or components thereof). Although any number of systems, in whole or in part, can implement the process 200, to simplify discussion, the process 200 will be described in relation to specific systems or subsystems of the computing environment 100.

At block 202, the table builder 134 defines a slice of a dimensional database utilizing a SQL dialect such as, for example, the exemplary SQL dialect described above. The slice typically includes at least one measurement and at least one dimension from the dimensional database. In a various embodiments, the table builder 134 allows a user to graphically define the slice, for example, by permitting the user to choose a dimensional database and graphically select the at least one measurement and the at least one dimension from a list. In still other embodiments, the table builder 134 can permit the user to directly specify a SQL-dialect query that constitutes the slice. It should be appreciated that that the block 202 can be repeated for any number of slices that the user desires to specify. In addition, in certain embodiments, the table builder 134 can allow the user to save the slice as a view of the dimensional database. Therefore, in these embodiments, the block 202 can be omitted in cases where the slice has already been specified and saved.

At block 204, the query builder 136 builds, in the SQL dialect, a single query that queries one or more data sources. In various embodiments, the single query can be built responsive to user input. The single query can query, for example, the slice defined at the block 202 as well as one or more non-dimensional data stores (e.g., one or more relational databases). In some embodiments, the user can also be permitted to directly specify the single query in the SQL dialect. As described above, the single query represents, using SQL constructs, each dimension and each measurement of each slice included therein. In addition, the single query includes data attributes of each of the one or more non-dimensional databases.

At block 206, the single query is parsed to generate a separate query for each data store that is queried. For example, a dimensional query (e.g., in MDX) could be specified for each dimensional database that is queried. In certain embodiments, the block 206 can include the execution engine 142 translating the single query to SQL and the database system 110 parsing the translated single query to generate each separate query. At block 208, the database system 110 executes each separate query on the respective data source. At block 210, the database system 110 combines query results and returns, to the execution engine 142, resultant data responsive the single query. At block 212, the resultant data is formatted and presented to the user. For example, the block 212 can encompass the query builder 136 presenting the resultant data to the user, the report builder 138 generating a report for further action or distribution, and/or the like.

Example of a Slice of a Dimensional Database

Figure 3:
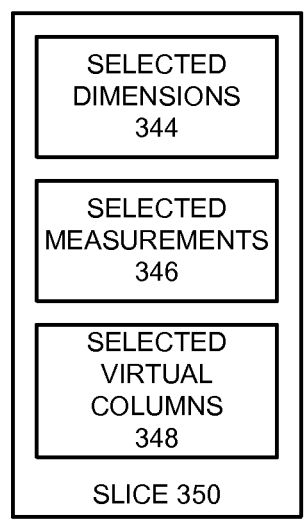
FIG. 3 is an exemplary block diagram of a slice of a dimensional database.

FIG. 3 is an exemplary block diagram of a slice 350 of a dimensional database. The slice 350 can be specified, for example, during the block 202 of FIG. 2. The slice 350 is generally a two-dimensional representation of a selected portion of a dimensional database. In the depicted embodiment, the slice 350 includes one or more dimensions 344, one or more measurements 346, and one or more virtual columns 348.

The one or more dimensions 344, the one or more measurements 346, and the one or more virtual columns 348 are expressable, for example, as columns in a table. In general, the one or more dimensions 344 and the one or more measurements 346 correspond to dimensions and measurements, respectively, as those dimensions and measurements already exist in the dimensional database. In contrast, the one or more virtual columns 348 are each a new column of data that do not have a direct counterpart in the dimensional database (e.g., as a dimension or measurement) but that can be derived in a rule-based fashion. For example, the one or more virtual columns 348 can provide a customized or manipulated form of a dimension or measurement of the dimensional database. In this manner, the one or more virtual columns 348 can provide greater user control and customization of queries. In some embodiments, the one or more virtual columns 348 are pre-specified for the dimensional database and are available for selection by the user. In other embodiments, the user is permitted to specify rules that constitute all or part of the one or more virtual columns 348.

An example of the slice 350 will now be described with respect to Tables 6-7. Table 6 illustrates, in a two-dimensional format, raw data that could be included in the dimensional database such that the columns labeled "Date," "Product," and "SalesPerson" represent dimensions and the columns labeled "Gross" and "Commission" represent measurements. According to this example, a user may desire to view and analyze sales by quarter. Therefore, the one or more virtual columns 348 could include a "Date_Quarter" virtual column that derives an appropriate quarter, for example, from the "Date" dimension of the dimensional database. The "Date_Quarter" virtual column would establish a grouping of the "Date" dimension into four three-month time periods per year. For example, the query below could define a slice such that, when the query is executed by the execution engine 142, the query would yield the data shown in Table 7.

SELECT Date_Quarter, Gross FROM Sales

TABLE 6

| Date | Product | Gross | SalesPerson | Commission |
|---|---|---|---|---|
| Jan. 1, 2012 | A | 2981 | 1 | 48 |
| Jan. 1, 2012 | B | 1546 | 1 | 64 |
| Feb. 1, 2012 | A | 8466 | 1 | 59 |
| Feb. 1, 2012 | B | 1799 | 2 | 77 |
| Mar. 1, 2012 | A | 8431 | 2 | 76 |
| Mar. 1, 2012 | B | 909 | 2 | 22 |
| Apr. 1, 2012 | A | 1400 | 1 | 44 |
| Apr. 1, 2012 | B | 6419 | 1 | 91 |
| May 1, 2012 | A | 5777 | 1 | 29 |
| May 1, 2012 | B | 3190 | 2 | 33 |
| Jun. 1, 2012 | A | 8941 | 2 | 8 |
| Jun. 1, 2012 | B | 3189 | 2 | 22 |
| Jul. 1, 2012 | A | 3672 | 1 | 16 |
| Jul. 1, 2012 | B | 7994 | 1 | 76 |
| Aug. 1, 2012 | A | 3331 | 1 | 51 |
| Aug. 1, 2012 | B | 3932 | 2 | 55 |
| Sep. 1, 2012 | A | 7569 | 2 | 91 |
| Sep. 1, 2012 | B | 9692 | 2 | 88 |
| Oct. 1, 2012 | A | 1024 | 1 | 10 |
| Oct. 1, 2012 | B | 3634 | 1 | 6 |
| Nov. 1, 2012 | A | 4564 | 1 | 98 |
| Nov. 1, 2012 | B | 5988 | 2 | 68 |
| Dec. 1, 2012 | A | 9143 | 2 | 11 |
| Dec. 1, 2012 | B | 1429 | 2 | 25 |

TABLE 7

| Date_Quarter | Gross |
|---|---|
| Jan. 1, 2012 | 35996 |
| Apr. 1, 2012 | 29303 |
| Jul. 1, 2012 | 17052 |
| Oct. 1, 2012 | 32669 |

Example of a Process for Defining a Slice of a Dimensional Database

Figure 4:
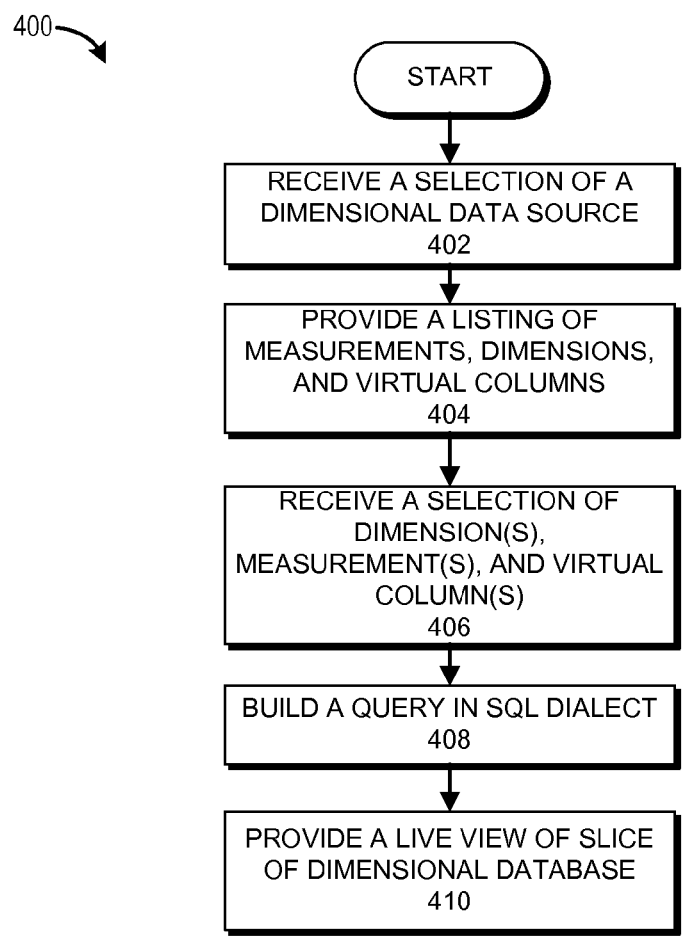
FIG. 4 illustrates a process for defining a slice of a dimensional database.

FIG. 4 presents a flowchart of an example of a process 400 for defining a slice of a dimensional database. The process 400 can be implemented by any system that can access one or more data sources. For example, the process 400, in whole or in part, can be implemented by one or more of the table builder 134, the query builder 136, the report builder 138, the database access system 140, the execution engine 142, and/or the database system 110 (or components thereof). Although any number of systems, in whole or in part, can implement the process 400, to simplify discussion, the process 400 will be described in relation to specific systems or subsystems of the computing environment 100. In various embodiments, the process 400 may be performed as all or part of the block 202 of FIG. 2.

At block 402, the table builder 134 receives a selection of a dimensional data source from a user. At block 404, the table builder 134 provides a listing of measurements, dimensions, and virtual columns associated with the selected dimensional data source. In some embodiments, the table builder 134 also allows the user to define and select a new virtual column. At block 406, the table builder 134 receives a selection of at least one dimension, at least one measurement, and any desired virtual columns. At block 408, the table builder 134 builds a query in a SQL dialect such as, for example, the exemplary SQL dialect described above. At block 410, the table builder 134 provides the user a live view of the slice of the dimensional database. In a typical embodiment, the user is permitted to continue to manipulating the slice, for example, by repeating all or part of the process 400, and subsequently viewing changes to the live view.

Example of a Process for Querying Dimensional and Non-Dimensional Data Sources

Figure 5:
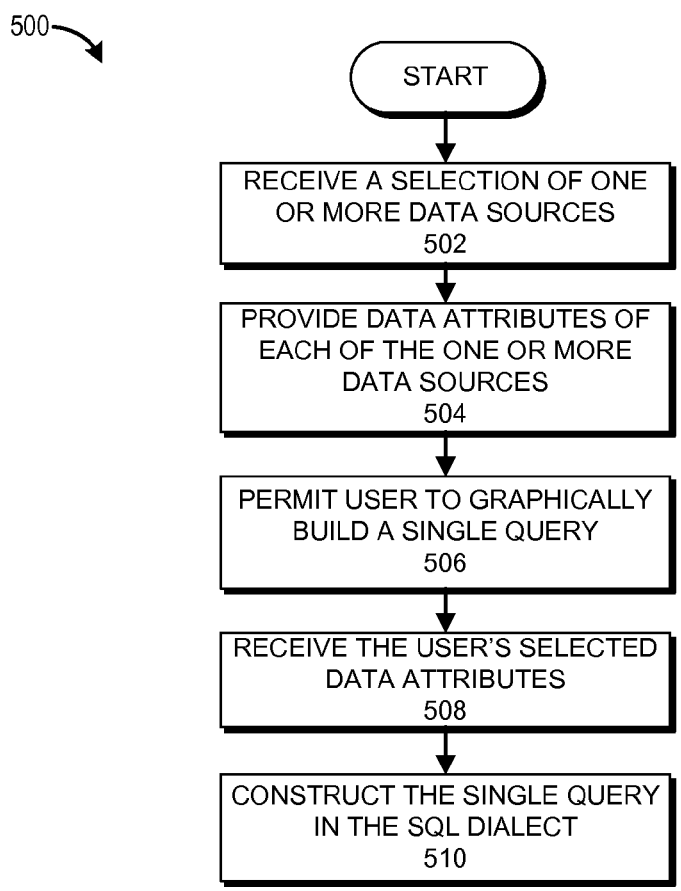
FIG. 5 illustrates a process for building a query in a SQL dialect.

FIG. 5 presents a flowchart of an example of a process 500 for building a query in a SQL dialect such as, for example, the exemplary SQL dialect described above. The process 500 can be implemented by any system that can access one or more data sources. For example, the process 500, in whole or in part, can be implemented by one or more of the table builder 134, the query builder 136, the report builder 138, the database access system 140, the execution engine 142, and/or the database system 110 (or components thereof). Although any number of systems, in whole or in part, can implement the process 500, to simplify discussion, the process 500 will be described in relation to specific systems or subsystems of the computing environment 100. In various embodiments, the process 500 may be performed as all or part of the block 204 of FIG. 2.

At block 502, the query builder 136 receives a selection of one or more data sources from a user. At block 504, the query builder 136 provides the user data attributes of each of the one or more data sources that are available for inclusion in a query. In the case of dimensional data sources, the query builder 136 provides the user the columns (including any virtual columns) of previously specified slices thereof. At block 506, the query builder 136 permits the user to graphically build a single query by selecting data attributes of each of the one or more data sources. At block 508, the query builder 136 receives the user's selected data attributes. At block 510, the query builder 136 constructs the single query in the SQL dialect.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system:
   receiving a selection of a plurality of data sources from a user, the plurality of data sources comprising a slice of a dimensional database and one or more non-dimensional databases, the slice comprising at least one dimension and at least one measurement of the dimensional database, wherein the slice is expressable as a table;
   providing, to the user, data attributes of each of the plurality of data sources;
   permitting the user to graphically build a single query that queries the slice and the one or more non-dimensional databases;
   receiving selected data attributes from the user responsive to the permitting; and
   constructing the single query in a SQL dialect, wherein the SQL dialect represents, using SQL constructs, the at least one dimension, the at least one measurement, and data attributes of the one or more non-dimensional databases.

2. The method of claim 1, comprising, prior to the receiving the selection of the plurality of data sources from the user, defining, responsive to user input, the slice of the dimensional database.

3. The method of claim 2, wherein the defining comprises:
   receiving a selection of a dimensional data source from a user;
   providing a listing of measurements and dimensions associated with the dimensional data source;
   receiving a selection of the at least one dimension and the at least one measurement; and
   building a SQL-dialect query representative of the slice.

4. The method of claim 2, wherein the defining comprises adding at least one virtual column.

5. The method of claim 2, wherein the defining comprises showing a live view of the slice as the user manipulates the slice.

6. The method of claim 1, comprising parsing the single query, the parsing comprising generating a dimensional query for the dimensional database and a non-dimensional query for each of the one or more non-dimensional databases.

7. The method of claim 6, wherein the parsing comprises:
   translating the single query from the SQL dialect to SQL; and
   parsing the translated single query to generate the dimensional query and the non-dimensional query.

8. The method of claim 6, comprising:
   the computer system executing the dimensional query on the dimensional database; and
   for each non-dimensional database of the one or more non-dimensional databases, the computer system executing the non-dimensional query on the non-dimensional database.

9. The method of claim 8, comprising combining query results and returning resultant data.

10. The method of claim 9, comprising presenting the resultant data to a user.

11. The method of claim 1, wherein the slice comprises a SQL-dialect query, the single query including the SQL-dialect query in a subselect statement.

12. The method of claim 1, wherein the single query comprises a table-identifier prefix for the slice and a table-identifier prefix for each of the one or more non-dimensional databases.

13. An information handling system comprising at least one processor, wherein the at least one processor is operable to implement a method comprising:
   receiving a selection of a plurality of data sources from a user, the plurality of data sources comprising a slice of a dimensional database and one or more non-dimensional databases, the slice comprising at least one dimension and at least one measurement of the dimensional database, wherein the slice is expressable as a table;
   providing, to the user, data attributes of each of the plurality of data sources;
   permitting the user to graphically build a single query that queries the slice and the one or more non-dimensional databases;
   receiving selected data attributes from the user responsive to the permitting; and
   constructing the single query in a SQL dialect, wherein the SQL dialect represents, using SQL constructs, the at least one dimension, the at least one measurement, and data attributes of the one or more non-dimensional databases.

14. The information handling system of claim 13, the method comprising, prior to the receiving the selection of the plurality of data sources from the user, defining, responsive to user input, the slice of the dimensional database.

15. The information handling system of claim 14, wherein the defining comprises:
   receiving a selection of a dimensional data source from a user;
   providing a listing of measurements and dimensions associated with the dimensional data source;
   receiving a selection of the at least one dimension and the at least one measurement; and
   building a SQL-dialect query representative of the slice.

16. The information handling system of claim 14, wherein the defining comprises adding at least one virtual column.

17. The information handling system of claim 14, wherein the defining comprises showing a live view of the slice as the user manipulates the slice.

18. The information handling system of claim 13, the method comprising parsing the single query, the parsing comprising generating a dimensional query for the dimensional database and a non-dimensional query for each of the one or more non-dimensional databases.

19. The information handling system of claim 18, wherein the parsing comprises:

translating the single query from the SQL dialect to SQL; and parsing the translated single query to generate the dimensional query and the non-dimensional query.

20. A computer-program product comprising a non-transitory computer-usable medium having computer-readable program code embodied therein, the computer-readable program code adapted to be executed to implement a method comprising:

receiving a selection of a plurality of data sources from a user, the plurality of data sources comprising a slice of a dimensional database and one or more non-dimensional databases, the slice comprising at least one dimension and at least one measurement of the dimensional database, wherein the slice is expressable as a table;

providing, to the user, data attributes of each of the plurality of data sources;

permitting the user to graphically build a single query that queries the slice and the one or more non-dimensional databases;

receiving selected data attributes from the user responsive to the permitting; and constructing the single query in a SQL dialect, wherein the SQL dialect represents, using SQL constructs, the at least one dimension, the at least one measurement, and data attributes of the one or more non-dimensional databases.

* * * * *